United States Patent [19]

McBee et al.

[11] 4,391,969
[45] * Jul. 5, 1983

[54] MODIFIED SULFUR CEMENT

[75] Inventors: William C. McBee; Thomas A. Sullivan, both of Boulder City, Nev.

[73] Assignee: The United States of America as represented by the Department of Commerce, Washington, D.C.

[*] Notice: The portion of the term of this patent subsequent to Jan. 19, 1999, has been disclaimed.

[21] Appl. No.: 266,484

[22] Filed: May 22, 1981

Related U.S. Application Data

[63] Continuation-in-part of Ser. No. 196,172, Oct. 14, 1980, Pat. No. 4,348,313, which is a continuation-in-part of Ser. No. 85,450, Oct. 16, 1979, Pat. No. 4,311,826.

[51] Int. Cl.³ .................................................. C08G 75/16
[52] U.S. Cl. .................................... 528/389; 524/609; 524/788
[58] Field of Search ........................................ 528/389

[56] References Cited

U.S. PATENT DOCUMENTS

| | | | |
|---|---|---|---|
| 2,806,843 | 9/1957 | Welch | 528/389 |
| 4,025,352 | 5/1977 | Leutner et al. | 106/70 |
| 4,058,500 | 11/1977 | Vroom | 260/42.24 |
| 4,190,460 | 2/1980 | Cassar | 106/287.32 |
| 4,290,816 | 9/1981 | Ludwig et al. | 528/389 |
| 4,311,826 | 1/1982 | McBee et al. | 528/389 |

OTHER PUBLICATIONS

Gregor et al., Sulphur Concrete, pp. 54–55, 68–77, 1978.
Sulphur Concrete & Coatings, Sudic No. 4, Raymont.
Bordoloi et al., New Uses of Sulphur—II, pp. 31–53, 1978.
Blight et al., New Uses of Sulphur—II, pp. 15–30, Spring, 1977.
Sulphur Institute Journal, pp. 6–8, 1976.
Sulphur Research & Development, pp. 20–21, 1978.
Sulphur Institute Journal, pp. 12–14, 1975.
Sulphur Research & Development, pp. 4–8, 1979.

Primary Examiner—Harold D. Anderson
Attorney, Agent, or Firm—Oblon, Fisher, Spivak, McClelland & Maier

[57] ABSTRACT

A modified sulfur cement formulation, comprising the polymeric reaction product of sulfur with a cyclopentadiene oligomer-dicyclopentadiene containing modifier in which the cyclopentadiene oligomer content of said modifier is at least 37 wt. %, the sulfur cement product having a softening point ranging up to 116° C.

8 Claims, 8 Drawing Figures

MODIFIED SULFUR CEMENT

CROSS-REFERENCE TO RELATED APPLICATIONS

This application is a continuation-in-part of application Ser. No. 196,172 filed Oct. 14, 1980, now U.S. Pat. No. 4,348,313, which in turn is a continuation-in-part of application Ser. No. 085,450 filed Oct. 16, 1979, now U.S. Pat. No. 4,311,826.

BACKGROUND OF THE INVENTION

1. Field of the Invention

The present invention relates to sulfur containing cement compositions. More particularly, the invention relates to cement compositions based upon the reaction product of sulfur with derivatives of cyclopentadiene.

2. Description of the Prior Art

The use of sulfur in the preparation of construction materials had been proposed as early as just after World War I when an acid resistant mortar compound of 40% sulfur binder mixed in 60% sand was prepared. However, upon thermal cycling such mortars exhibit a loss in flexural strength resulting in failure of the mortars. The use of sulfur as a binder in the preparation of concretes when combined with an aggregate such as crushed rock or gravel has also been investigated. However, after solidification the sulfur in these concretes undergoes allotropic transformation wherein the sulfur reverts to the more dense orthorhombic form which results in a product that is highly stressed and therefore vulnerable to failure by cracking.

One system which has been involved in a number of investigations is the modification of sulfur with unsaturated hydrocarbon materials, primarily dicyclopentadiene. Several articles show a sulfur cement formulated by blending on the order of several percent to about 15% dicyclopentadiene as a binder with sulfur (W. C. McBee and T. A. Sullivan, *Sulphur Institute Journal*, Fall 1976; *Sulphur Research and Development*, 1, (1978) pp. 20–21; *Sulphur Institute Journal*, Spring 1976, pp. 6–8). Leutner et al., U.S. Pat. No. 4,025,352, show a sulfur cement formulation in which on the order of several percent dicyclopentadiene as a modifier is blended with sulfur. Heating of the blend at temperatures in the range of 120° C. to 160° C. achieves the reaction of sulfur with dicyclopentadiene and a hardened sulfur based cement product is obtained. Gregor and Hackl, *New Uses of Sulfur—II*, pp. 68–77 (1978) show the use of dicyclopentadiene as a binder for sulfur in sulfur cement formulations and provide data showing the compressive strength and flexural strength characteristics of concrete formulations of the sulfur based cement with aggregate such as basalt and granulit. B. K. Bordoloi and E. M. Pearce, *New Uses of Sulfur—II*, pp. 31–53 (1978) discuss the copolymerization of sulfur and dicyclopentadiene, particularly with respect to the mechanism by which sulfur reacts with dicyclopentadiene to form polymeric polysulfide products. Vroom, U.S. Pat. No. 4,058,500, shows a somewhat different sulfur based cement formulation in that sulfur is blended with a viscosity increasing, finely divided stabilizer and an olefinic hydrocarbon polymer material as a binder. The reference, however, appears not to include dicyclopentadiene as a hydrocarbon polymeric material because it describes dicyclopentadiene as a prior art binder having a nauseating odor and being toxic at low concentrations, as well as requiring refluxing when it is reacted with sulfur to avoid excessive material loss. Another important disadvantage of dicyclopentadiene as a modifier is that its reaction with sulfur is exothermic and causes a rapid increase in binder viscosity to unworkable levels. Because of this fact very careful preparation of the modifier is necessary which causes considerable operational difficulties on a commercial scale.

Other references which disclose the utilization of dicyclopentadiene as a modifier of sulfur in sulfur cement formulations include Diehl, *New Uses For Sulfur and Pyrites*, Madrid Symposium of the Sulfur Institute, 1976; McBee et al., *Utilization of Secondary Sulfur In Construction Materials*, Proceedings of the Fifth Mineral Waste Utilization Symposium, 1976; Sullivan et al., *Development and Testing of Superior Sulfur Concretes*, 1976 and *Sand-Sulfur-Asphalt Paving Materials*, 1975 (both Bureau of Mines Reports of Investigations); and Sullivan et al., *Sulfur In Coatings and Structural Materials*, Advances In Chemistry No. 140. The latter Sullivan et al. reference also shows the use of other olefinic compounds such as dipentene, methylcyclopentadiene, styrene and the like as modifiers in sulfur based cement formulations.

The Welch reference, U.S. Pat. No. 2,806,843, is another relevant prior art reference insofar as it shows cyclodiene sulfo-resins formed by the reaction of sulfur with dicyclopentadiene. The reference broadly shows the reaction of about 25 wt. % to 75 wt. % sulfur with dichclopentadiene or related cyclic diolefin. The reference exemplifies the specific reaction of sulfur with polycyclopentadiene in a 1:1 wt. ratio where the polycyclopentadiene is defined as a mixture of dimer, trimer, tetramer and pentamer products of cyclopentadiene (unspecified proportions). However, the sulfo-resin product obtained has a very high softening point of about 141° C. indicating that the product of the reaction is a highly viscous mass which sets-up during reaction making stirring impossible. The sulfur cement product of the present invention, on the other hand, is a highly fluid material during the reaction of sulfur with the olefinic modifier.

In view of the problems inherent in the use of dicyclopentadiene as a modifier for sulfur based cement formulations, a need continues to exist for a binder for use with sulfur which will yield modified sulfur cement formulations of improved processing and strength characteristics.

SUMMARY OF THE INVENTION

Accordingly, one object of the present invention is to provide a modified sulfur cement which possesses excellent strength and freeze-thaw stability characteristics.

Another object of the present invention is to provide a modified sulfur cement of improved workability.

Still another object of the present invention is to provide a sulfur based cement which sets-up into a rigid cement product.

Briefly, this object and other objects of the present invention as hereinafter will become more readily apparent can be attained by a modified sulfur cement formulation comprising the polymeric reaction product of sulfur with from 2–20 wt. % of a cyclopentadiene oligomer-dicyclopentadiene containing modifier in which the cyclopentadiene oligomer content of said modifier is at least 37 wt. %, said sulfur cement product having a softening point ranging up to 116° C. A concrete formulation can be prepared by blending an aggregate with the modified sulfur cement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
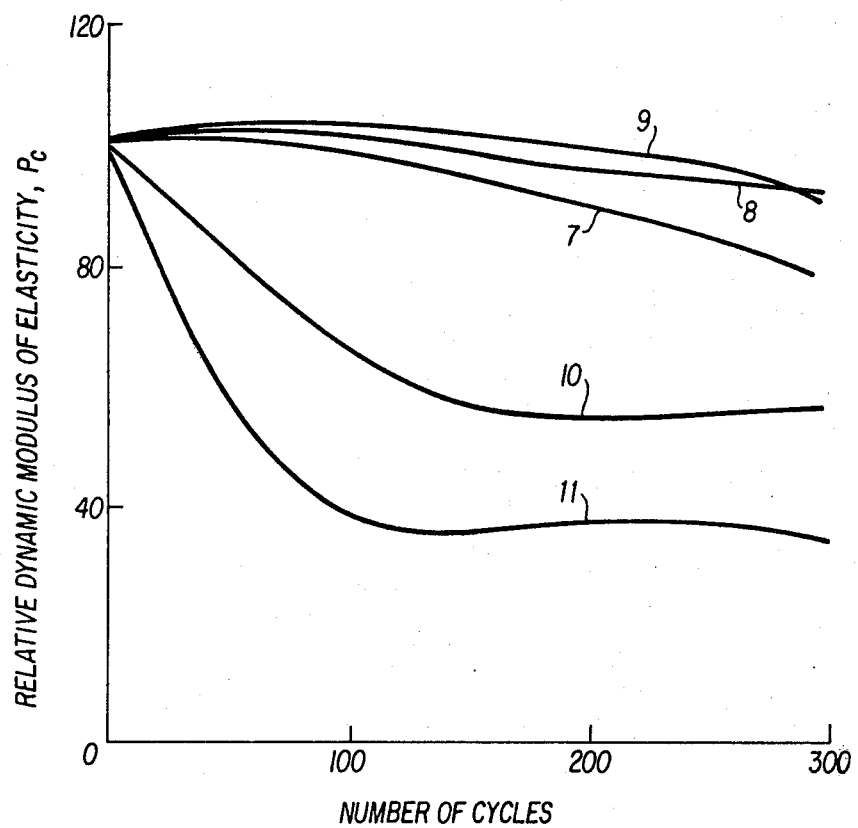
FIG. 1 is a graph showing the relative dynamic modulus profile of several sulfur containing concrete materials after repeated freeze-thawing cycles.

Sulfur cement formulations are known as discussed above based upon the combination of sulfur with dicyclopentadiene as a modifier. In order to produce a hardened cement product the formulation is heated and allowed to set. The improved cement formulation of the present invention is based upon the discovery that the presence of cyclopentadiene oligomer in admixture with dicyclopentadiene (DCPD) modifies the reaction between sulfur and dicyclopentadiene to the extent that a hardened product of significantly improved strength characteristics is obtained. Moreover, when the oligomer content of the dicyclopentadiene reactant is maintained at or above certain minimum levels, the sulfur-DCPD mixture during reaction exhibits very stable viscosity characteristics over extended periods of time thus substantially improving the processing and handling characteristics of the modified sulfur cement formulation during use.

It is well known that the reaction between sulfur and cyclopentadiene dimer to form the modified sulfur component of the cement must be carefully controlled because of the exothermicity of the reaction between sulfur and dicyclopentadiene. Cyclopentadiene is commercially available in the form of the dimer thereof. Liquid cyclopentadiene dimer will spontaneously depolymerize to the monomer at room temperature. This depolymerization reaction will accelerate greatly in the presence of sulfur at an elevated temperature of 120°–140° C. as shown by the following reaction.

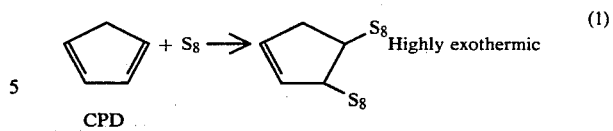

Because of the exothermicity of reaction (1) it is difficult to control. However, when the dimer is present in the reaction mixture, the dimer reacts with the polysulfide product formed in reaction (1) as shown below in reaction (2).

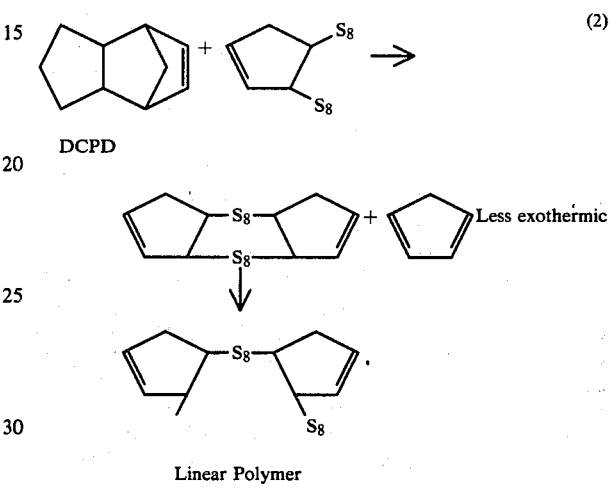

Reaction (2) between cyclopentadiene dimer and the polysulfide-cyclopentadiene product is significantly less exothermic than reaction (1). However, it is still difficult to control. It is evident from the above discussion, as is well known, that the combined exothermicity of reactions (1) and (2) presents significant control problems, because if control of the reactions is not maintained, extensive apparatus damage will occur and an undesirable, highly viscous rubber-like polymer is formed. On the other hand, when control of the reaction is maintained, as it is in the present invention by the procedure described below, the reaction results in the formation of linear polymeric polysulfides which are the essential components of the durable cement of the present invention.

In the preparation of the polymeric modified sulfur cement of the present invention, the desired control of the above exothermic reactions is achieved by conducting the reaction between sulfur and dicyclopentadiene in the presence of a quantity of cyclopentadiene oligomer sufficient to achieve the desired linear polysulfide polymeric products and sufficient to maintain a workable cement formulation. (In the context of the present invention, the term oligomer is used in its art recognized meaning of being a partially polymerized product of at least three up to a limited number of cyclopentadiene units. More specifically, the term oligomer embraces a product mixture of trimers, tetramers, pentamers and the like of cyclopentadiene in varying amounts. The term oligomer excludes dicyclopentadiene.) In order to obtain a cement product of the strength characteristics within the scope of the present invention, the amount of oligomer present in the organic modifier containing dicyclopentadiene must be a minimum of about 37 wt. %, preferably about 45 wt. %, and can range up to very high levels as long as the organic material contains a sufficient amount of dicyclopentadiene to initiate the reaction with the sulfur. That is, a sufficient amount of cyclopentadiene monomer derived from the decomposition of dimer should be present to initiate the reaction. Preferably the modifier contains up to 75 wt. % oligomeric cyclopentadiene adduct and the reaction can be illustrated as follows:

are not purely oligomer and dicyclopentadiene respectively, the content of cyclopentadiene and dimer in the oligomer source used should be known within reasonable limits, as well as the content of any oligomers in the source of dicyclopentadiene used in order to arrive at the correct combination of ingredients to meet the limitations with respect to the minimum amount of oligomer needed in the modifier to formulate a cement mix-

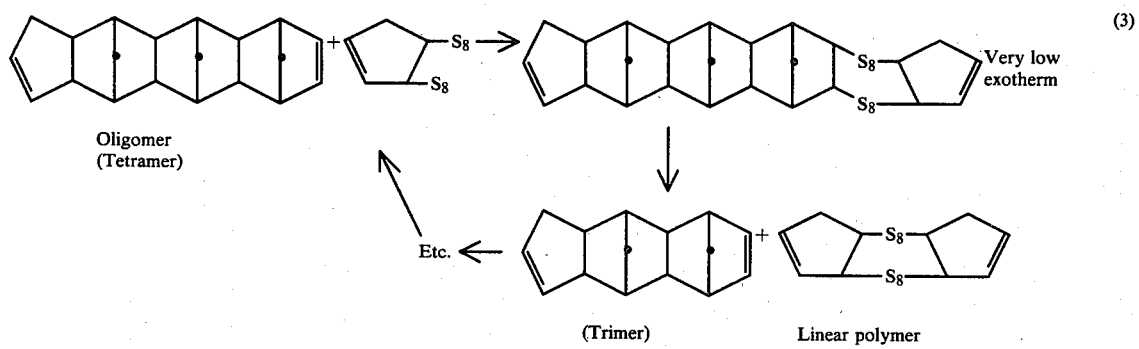

(3)

ture within the scope of the present invention.

The reaction between the sulfur-cyclopentadiene adduct and the oligomer exhibits very low exothermicity because the oligomer breaks down very slowly to the final state of dicyclopentadiene. This is why the reaction is virtually non-exothermic and why the oligomer is used in the present reaction to moderate the polymerization of sulfur with cyclopentadiene.

The amount of sulfur mixed with the dicyclopentadiene oligomer modifier generally ranges from 98 to 80 wt. % sulfur with 2 to 20 wt. % modifier, preferably 98 to 90 wt. % sulfur to 2 to 10 wt. % modifier. The reaction between sulfur and the modifier is generally conducted without the presence of a solvent, however, if desired such hydrocarbon materials as vinyltoluene, styrene, indene and α-methylstyrene can be used as a solvent.

In the reaction between sulfur and cyclopentadiene virtually any source of cyclopentadiene-oligomer can be used. These sources range from virtually pure cyclopentadiene oligomer mixtures to oligomer sources contaminated with other olefinic materials. Normally, cyclopentadiene oligomer is obtained from the production of dicyclopentadiene resin as steam sparge oils. These oils are the generally undesirable low molecular weight components of the system which are commonly disposed of as a fuel. In the manufacture of dicyclopentadiene resins, generally a crude form of dicyclopentadiene liquid is used as a feedstock for the reaction and is blended with crude vinyl aromatic streams rich in styrene, indene and α-methystyrene, as well as vinyltoluene with about a 30-40% pure liquid dicyclopentadiene before polymerization. Thus, the actual sulfur containing polymer material obtained in the present invention by the use of such crude oligomer sources besides consisting of low molecular weight polymers of dicyclopentadiene, will also consist of dicyclopentadiene copolymers of vinyl aromatic compounds and some mixed vinyl aromatic polymers. A typical oligomer starting material is one which contains the following constituents: 5% cyclopentadiene, 10% each of dimer and trimer, 20% tetramer, 45% pentamer and 10% traces of high polymers such as alkyl naphthalenes, vinyl dicyclopentadiene aromatic copolymers. In view of the fact that for most practical applications oligomer materials as well as dicyclopentadiene materials are used which In the reaction between sulfur and the modifier, whether as a cement or a concrete formulation, the temperature utilized should range from 115° C. to 160° C. over a time period ranging from one to fifteen hours. The reaction between sulfur and modifier can be conducted in any type of conventional reaction vessel although a sealed reactor is preferable, but not essential. The product of the reaction is liquid above about 115° C. and therefore can be handled in liquid form at or about this temperature. The product cement is thermoplastic and solidifies below 120° C. Generally, temperatures above about 180° C. are unnecessary. During the reaction between sulfur and the modifier, the reaction mass exhibits a relatively stable viscosity which, for the relatively rigid cement product of the invention, ranges up to about 180 cp as measured at 135° C. Preferably, the viscosity for the reaction mass ranges from 25 to 180 cp at 135° C. A characteristic of the rigid cement product of the present invention is that it has a softening point which ranges as high as about 116° C.

The sulfur-modifier cement formulation of the present invention can be employed in a wide variety of applications similar to the uses of Portland and asphaltic cements. For example, the modifier sulfur cement formulation of the invention can be blended with any suitable conventional aggregate to prepare a sulfur based concrete. In order to prepare a concrete product, the aggregate can simply be blended with the sulfur-modifier combination and the mixture is heated at a temperature above that at which the cement becomes liquid. Normally a temperature of 125° C. to 150° C., preferably 130° C. to 150° C. is employed during blending. Suitable modified sulfur concrete formulations can be prepared by blending 7 to 80% by wt. modified sulfur cement formulation with 93% to 20% by wt. aggregate. Suitable aggregates for concrete formulation include particulate granite, quartz, limestone, volcanic material and the like. In the preparation of mortar compositions based on the modified sulfur cement formulation of the present invention, from 40 to 50% by wt. of the sulfur-modifier combination is mixed with from 50 to 60% by wt. of a finely divided aggregate. Suitable common aggregates for mortar preparation include sand, mica, fiberglass, asbestos, silica flour, talc and the like. These same aggregates or fillers can be employed to form sulfur coating materials which can be applied on suitable surfaces by conventional application techniques such as by brushing, spraying, rolling or the like.

In an especially preferred method of blending the modifier, sulfur and aggregate components of a concrete, mortar or the like formulation and obtaining a hot mixture for application, the aggregate selected is heated to a temperature as high as 230° C. The hot aggregate supplies the heat for the melting flake-like, modified sulfur cement component and for heating any filler material added such as silica flour in the concrete mixer, whereby a sulfur concrete product is obtained at a temperature of 125° C. to 160° C. ready for use. Concrete formulations prepared from super-heated aggregate can be prepared by this technique using the present modified cement component because of the thermostability of the cement. On the other hand, sulfur cements modified with dicyclopentadiene alone cannot be used to prepare concretes by this technique because DCPD cements are not thermostable. Rather, the DCPD cements further react and form unusable products if exposed to heated aggregates at a temperature exceeding 160° C.

In the preparation of a modified sulfur concrete by the above-described technique any modified sulfur cement formulation can be used based upon the combination of from about 15 wt. %–90 wt. % cyclopentadiene and/or dicyclopentadiene to 85 wt. %–10 wt. % oligomer. Preferably, the modified sulfur cement formulation blended with the aggregate is one which contains at least 37 wt. % oligomer in the modifier component with sufficient cyclopentadiene and/or dicyclopentadiene to initiate the reaction. The ratio of modifier to sulfur in the modified sulfur cement formulation can be as described above.

Two specific embodiments of the above-described general technique for preparing a modified sulfur cement are as follows:

(a) A laboratory sized sulfur concrete unit was designed in which the aggregate can be heated to a desired temperature (150° C. to 230° C.) in a propane fired heating kiln and the hot aggregate is then discharged into a mortar mixer. Modified sulfur in either liquid or flake form is added and the mixture mixed for two minutes with the hot sulfur concrete mixture (125° to 160° C.) being ready for use. This unit has a capacity of approximately three tons of sulfur concrete per hour.

(b) A large mixer capable of commercial preparation of sulfur concrete was designed and commercially constructed using the same principle of using the super-heated aggregate to mix with the sulfur cement and filler material to prepare the sulfur concrete. This unit has a reciprocating feeder to blend the proper amounts of coarse and fine aggregate and to feed them in a propane fired kiln to a desired temperature (150° to 230° C.). The heated aggregate is then dropped into a pug mill mixer along with flake sulfur and filler where the super-heated aggregate supplies the heat to melt the cement and also to heat the filler, and the resultant materials are mixed in the pug mill for a period of about one minute. The sulfur concrete mixture can be discharged from the mixer at a temperature of 125° to 160° C. for use.

The modified sulfur cement formulation of the present invention can be used to prepare compositions suitable for use as spray coatings containing from 80% to 95% by wt. sulfur cement in combination with 5 to 20% by wt. finely divided aggregate.

When any of the above cement formulations are used in a particular application, the formulations rapidly set since the sulfur modified cement component is thermoplastic and solidifies within a few minutes.

Having generally described this invention, a further understanding can be obtained by reference to certain specific examples which are provided herein for purposes of illustration only and are not intended to be limiting unless otherwise specified.

In considering the data in Examples 1–5 it should be borne in mind that the various quantities of dicyclopentadiene and oligomer used in the formulations shown do not represent precise ratios of dicyclopentadiene to oligomer since the amounts of dicyclopentadiene and oligomer used are those of impure commercial grades of dicyclopentadiene and oligomer.

EXAMPLE 1

A series of modified sulfur concrete materials were prepared by employing the amounts of ingredients shown in Table 1 below. Modified sulfur cements were prepared by reacting the amounts of sulfur, oligomer and dicyclopentadiene shown at 130° C. for 24 hours. The modified sulfur cements were then blended with the aggregates shown in the table at 140° C. The physical properties of the resulting cements are also shown in Table 1.

TABLE 1

| | PROPERTIES OF MODIFIED SULFUR CONCRETES | | | | | | |
|---|---|---|---|---|---|---|---|
| Test No. | Aggregate Type(wt. psct) | Sulfur[1] wt. pct | Dicyclopentadiene wt-pct | Oligomer wt-pct | Strength, psi[2] | | |
| | | | | | Compressive | Tensile | Flexural |
| 1 | Quartz(77) | 23 | 2.50 | 2.50 | 4,885 | 630 | 1,010 |
| 2 | Quartz(77) | 23 | 3.75 | 1.25 | 6,180 | 715 | 1,230 |
| 3 | Quartz(77) | 23 | 3.25 | 1.75 | 4,920 | 685 | 740 |
| 4 | Limestone(79) | 21 | 2.50 | 2.50 | 6,710 | 985 | 1,230 |
| 5 | Limestone(79) | 21 | 3.75 | 1.75 | 8,170 | 1,020 | 1,570 |
| 6 | Limestone(79) | 21 | 3.25 | 1.25 | 7,300 | 825 | 1,480 |

[1]Sulfur modified by reaction with 5 wt-pct of dicyclopentadiene and oligomer.
[2]Strength values are the average of 3 samples values.

EXAMPLE 2

A series of limestone based, sulfur concrete were prepared in the same manner as described in Example 1 above employing the quantities of raw materials shown in Table 2 below. The sulfur concrete materials were employed in a series of feeeze-thaw durability tests under prescribed test conditions (ASTM method C 666-73, Procedure A).

TABLE 2
RESIDUAL STRENGTH AFTER FREEZE-THAW TESTING

| Samples | Sulfur Cements | Composition, pct DCPD-Oligomer | Limestone | Modulus of Rupture, psi Initial | Modulus of Rupture, psi Final | Residual Strength, pct |
|---|---|---|---|---|---|---|
| 7 | 21[1] | (75–25) | 79 | 1,570 | 1,430 | 91.0 |
| 8 | 21[1] | (65–35) | 79 | 1,480 | 785 | 53.0 |
| 9 | 21[1] | (50–50) | 79 | 1,230 | 865 | 70.3 |
| 10 | 21[1] | (100–0) | 79 | 1,235 | 470 | 38.0 |
| 11 | 24 | (0–0) | 76 | 810 | 285 | 35.2 |

[1]Sulfur modified by reaction with 5 wt. -pct of the indicated amounts of DCPD and Oligomer.

The results of the tests are shown in FIG. 1, which shows that concrete samples 7 to 9 withstood 300 freeze-thaw cycles (the maximum number of cycles prescribed in the standard test.) while maintaining 90% of the original dynamic modulus values. (The data in Table 2 show the initial and final modulus of rupture values of the various formulations as well as the residual strength values of the formulations.) The available data show that the modified sulfur concretes prepared from the reaction between sulfur and oligomer-dicyclopentadiene exhibit degrees of durability and residual strength superior to the concretes prepared from sulfur cements unmodified with cyclopentadiene based materials or modified only with dicyclopentadiene.

EXAMPLE 3

A modified sulfur cement formulation was prepared by reacting 95 wt. % sulfur with a 5 wt. % mixture of 3.25 wt. % dicyclopentadiene and 1.75 wt. % cyclopentadiene oligomer at 130° C. for 24 hours. An amount of 23 wt. % of the modified sulfur cement was mixed with 77 wt. % of quartz aggregate at 135° C. (275° F.). The freshly prepared concrete was then cast into molds to form the desired concrete slabs. Two of the prepared slabs (slabs 3 and 4 in Table 3 below each 4 ft.×4 ft.×4 in.) having the indicated strength properties are currently being tested in the corrosive floor environments of a potassium muriate plant and a langbeinite plant respectively where their resistance to corrosion characteristics and physical properties are being determined for comparative purposes with other sulfur based and Portland cement based concrete slabs. Two other prepared slabs designated as slab nos. 35 and 36 (2 ft.×2 ft.×2½ in.) in Table 3 below were installed for test purposes in the corrosive environment of a zinc refinery plant. One slab (#35) was installed in an oxide plant while the other was installed in a sulfide plant. Each slab is being monitored for its resistance to saline and acidic liquors along with other conventional sulfur and Portland cement based slabs. Still further, two other prepared slabs designed as slab nos. 25 and 26 in Table 3 below were installed in a copper refinery along with other types of concrete slabs for corrosive test purposes in highly corrosive areas of the refinery. The initial strength characteristics of all prepared slabs are also shown in Table 3.

TABLE 3
SULFUR CONCRETE TEST SLAB DATA

| Slab No. | Location | Strength, psi Compressive | Strength, psi Flexural | Strength, psi Tensile |
|---|---|---|---|---|
| 3 | Carlsbad | 3,190 | 930 | 620 |
| 4 | Carlsbad | 3,570 | 980 | 850 |
| 35,36 | Corpus Christi | 5,030 | 1,205 | 730 |
| 25,26 | Amarillo | 3,435 | 1,065 | 700 |

EXAMPLE 4

A series of modified sulfur cement based spray coating compositions were formulated from the quantities of ingredients specified in Table 4 below. The various modified sulfur cement formulations were prepared by reacting sulfur and oligomer-dicyclopentadiene mixtures in the quantities described in the footnotes of the table at 130° for 24 hours. Samples of the modified sulfur cements were then mixed with fiberglass or mica in the amounts indicated in the table at 140° C. The various formulations were then sprayed upon concrete blocks each 1 ft. square by 1 in. thick to yield coated products wherein the sprayed coatings had the strength properties shown in the table.

TABLE 4
MODIFIED SULFUR SPRAY COATINGS

| Composition, pct | | Impact Strength, in-lb | Flexural Strength, psi |
|---|---|---|---|
| Sulfur | Mica | | |
| 99[1] | 1 | 1.0 | 385 |
| 97[1] | 3 | 1.0 | 575 |
| 95[1] | 5 | 1.5 | 665 |
| 93[1] | 7 | 3.0 | 870 |
| 91[1] | 9 | 3.5 | 1,085 |
| 80[2] | 20 | 11.0 | 2,000 |
| 80[3] | 20 | 12.0 | 2,485 |
| Sulfur | Fiberglass | | |
| 99[1] | 1 | 4.0 | 625 |
| 98[1] | 2 | 7.0 | 850 |
| 97[1] | 3 | 23.0 | 1,100 |

[1]Sulfur modified by reaction with 1 pct DCPD and 1 pct. oligomer
[2]Sulfur modified by reaction with 3.25 pct DCPD and 1.75 pct oligomer
[3]Sulfur modified by reaction with 2.5 pct DCPD and 2.5 pct oligomer.

EXAMPLE 5

Flexible sulfur paving materials can be formulated by increasing the modifier in the range of >10% by wt. of the sulfur. As shown in Table 5 below several paving compositions were prepared by reacting 80%, 70% and 60% sulfur with 20%, 30% and 40% of a DCPD oligomer mixture (80% oligomer—20% DCPD) at a temperature of 130° C. for a time ranging from 1 hr. to 24 hrs. A typical conventional asphalt material, i.e. AR 4000 West Coast Asphalt, is also shown for comparative purposes. Highly flexible binder materials with characteristics quite similar to asphalt were formulated with the properties shown in the table below.

TABLE 5

| | PLASTICIZER (pct) | | | |
|---|---|---|---|---|
| Property | 20 | 30 | 40 | AR 4000 West Coast Asphalt |
| Viscosity, 275° (CP) | 330 | 450 | 650 | 225 |
| Penetration, 77° F. | 136 | 93 | 66 | 70 |

TABLE 5-continued

| | PLASTICIZER (pct) | | | |
|---|---|---|---|---|
| Property | 20 | 30 | 40 | AR 4000 West Coast Asphalt |
| Softening Point, °F. | 104 | 110 | 116 | 120 |
| Specific gravity | 1.730 | 1.560 | 1.469 | 1.001 |

By using placticized binder with graded aggregate, pavement values listed in Table 6 were obtained. The modifier sulfur cement formulations above containing 30% and 40% DCPD-oligomer mixture were blended in amounts of 6% with 94% of quartz aggregate. Limestone and volcanic aggregate function equally as well.

TABLE 6
MARSHALL PROPERTIES (ASTM)

| | Plasticizer, pct | | |
|---|---|---|---|
| | 30 | 40 | AR 4000 Asphalt |
| Stability, lb | 3,000 | 2,300 | 2,100 |
| Flow, 0.01 in | 10 | 12 | 10 |
| Specific gravity | 2.321 | 2.407 | 2.354 |
| Voids, pct | 3 | 3 | 3 |
| Binder pct | 6 | 6 | 6 |
| Aggregate, pct | 94 | 94 | 94 |

As indicated the material characteristics are quite similar to asphaltic materials and offer the possibility of a total replacement for asphaltic concrete pavements. The materials are also highly corrosion resistant and show great potential as construction materials for use in many corrosive industrial applications. In highway paving applications the materials should be valuable as corrosion resistance bridge decking.

EXAMPLE 6

Table 7 below shows the types of commercial grade oligomer material and dicyclopentadiene used in the preparation of various modified cement formulations within the scope of the present invention.

TABLE 7

| Material | Grade |
|---|---|
| DCPD material A | Commercial 80% DCPD |
| DCPD material B | Commercial 77% DCPD |
| DCPD material C | Pure 97% DCPD |
| Oligomer material D | Commerial Oligomer (85% Oligomer) |
| Oligomer material E | Commercial Oligomer (85% Oligomer) |

6-A

A series of modified cement formulations in 500 lb. batches based on the combination of 95 wt. % sulfur with 5 wt. % organic material were prepared from different combinations of DCPD with oligomer as shown below in Table 8 and heated at a temperature of 135° C. for 24 hours. The viscosity of each formulation was measured over this period and the results are shown in FIG. 2.

TABLE 8

| Relative Amounts of Crude DCPD to Crude Oligomer in Modifer | Actual Relative Amounts of DCPD to Oligomer in Each Formulation |
|---|---|
| 1. 65% C - 35% D | 68.5% DCPD - 31.5% oligomer |
| 2. 65% C - 35% E | 68.5% DCPD - 31.5% oligomer |
| 3. 58% C - 42% E & D | 62% DCPD - 37% oligomer |
| 4. 50% C - 50% E | 56.0% DCPD - 44% oligomer |
| 5. 65% A - 35% D | 57.5% DCPD - 42.5% oligomer |
| 6. 65% A - 35% E | 57.5% DCPD - 52.5% oligomer |
| 7. 50% A - 50% D | 47.5% DCPD - 52.5% oligomer |

Figure 2:
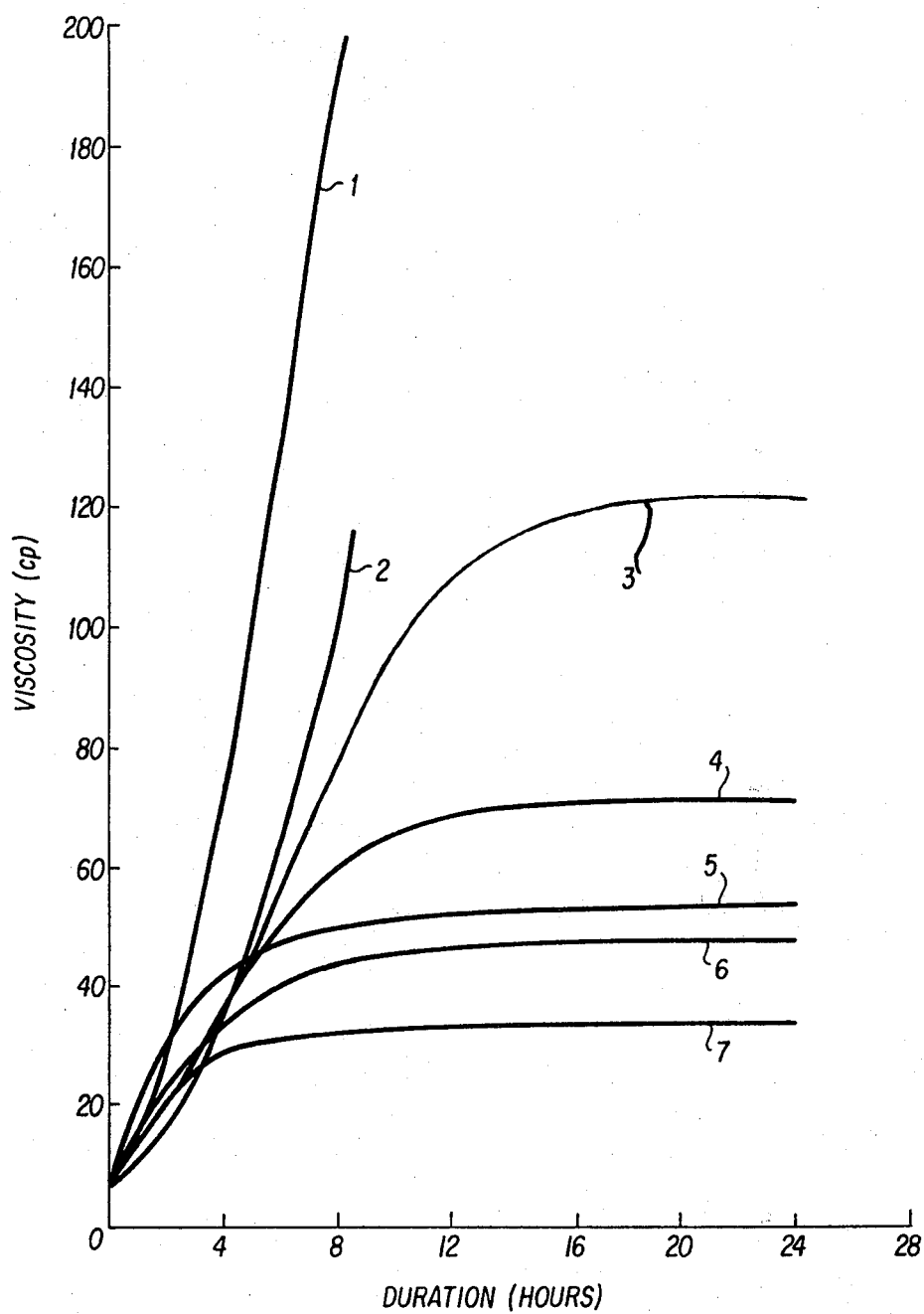
FIG. 2 is a graph of the viscosity of several hot melt modified sulfur cement formulations as a function of time.

The plots in FIG. 2 show that four formulations based on organic material blends 1 and 2 (at low oligomer levels) the reaction blends 1 and 2 (at low oligomer levels) the reaction between sulfur and organic material was continuously occurring after 8 hours, and the material had to be removed from the reactor to prevent setting up in the reactor. On the other hand, the heated cement formulations based on modifier organic material blends 3–7 gave controlled reactions with a stable product being obtained within about 6 hours after initiation of the reaction.

The different chemical nature of the modified sulfur cement formulations based upon a modifier containing a minimum 37 wt. % oligomer as compared to modified sulfur cements containing insufficient amounts of oligomer or no oligomer at all is substantiated by reference to FIGS. 10a and 10b of the above cited Gregor and Hackl reference. FIG. 10a shows the viscosity of a specific sulfur DCPD melt at several different temperatures as a function of time. The plots show that at no temperature does the viscosity stabilize indicating a stable hot product for any significant period of time. FIG. 10b shows the viscosity of four different sulfur-DCPD formulations at a reaction temperature of 140° C. The results obtained also show no stable product for any period of time over the reaction period investigated.

6-B

A series of runs using various ratios of DCPD to oligomer in 5 wt. % modifier organic material to 95 wt. % sulfur were conducted in a commercial plant using a nine ton steam jacketed reactor. Five types of modified sulfur formulations were prepared based on the compositions shown in Table 7 in batch runs of four to six hours duration. The product of each batch was solidified, flaked, and bagged in 50 lb. bags. Data on the materials are shown in Table 9.

TABLE 9

| Relative Amounts of Crude DCPD to Crude Oligomer in Modifier | Actual Relative Amounts of DCPD to Oligomer in Each Formulation | Product ton | Viscosity cp,av |
|---|---|---|---|
| 7. 65% B-35% E | 55.5% DCPD-44.5% oligomer | 117 | 41 |
| 8. 50% C-50% E | 56% DCPD-44% oligomer | 144 | 25 |
| 9. 50% C-50% D | 56% DCPD-44% oligomer | 9 | 41 |
| 10. 50% A-50% D | 47.5% DCPD-52.5% oligomer | 9 | 28 |
| 11. 65% A-35% D | 57.5% DCPD-42.5% oligomer | 27 | 27 |

Products prepared in the production runs were easily controlled in the reaction process and results parallel laboratory studies. Addition of the chemical modifiers into the sulfur at 140° C. resulted in an initial temperature drop of 10° to 15° C. In one hour, the temperature had risen again to 140° C. from the steam heat and heat of reaction and was held at this temperature for the rest of the four to six hours reaction period. Tests on the sulfur concrete products produced with these materials have shown that the best results with the greatest workability were obtained with the products based on modifier mixtures 8-10.

6-C

During the production of a seven ton sulfur concrete acid sump using sulfur concrete composed of 81 pct quartz aggregate and 19 pct of the sulfur based 65-35 modifier mixture identified as formulation 1 in Table 8, a total of 26 batches of concrete were prepared in a laboratory batch mixer. During the early production stages in order to increase the heat during casting, batch temperatures of 285° F. were used. Severe thickening of the concrete mixture was encountered and extreme difficulty was experienced in unloading the laboratory mixer. When the mix temperature was dropped below 270° F., good workability was obtained, however, the concrete contained insufficient heat to give adequate working time and the mold resulted in an inferior casting.

Using another concrete formulation based on a sulfur based 50-50 mixture containing at least 44% olibomer, a second casting was produced using concrete mixture temperatures as high as 320° F. without encountering thickening of the concrete mixture. This additional heat from the concrete (50° F.) resulted in a much more workable material and a superior casting. Other properties of the concretes such as physical, mechanical, and chemical are about the same regardless of DCPD-oligomer mixture levels. The primary difference is in the thermal stability of the cement and concrete. When formulated at a sufficient minimum oligomer level, highly stable products can be achieved with assurance.

6-D

Figure 3A:
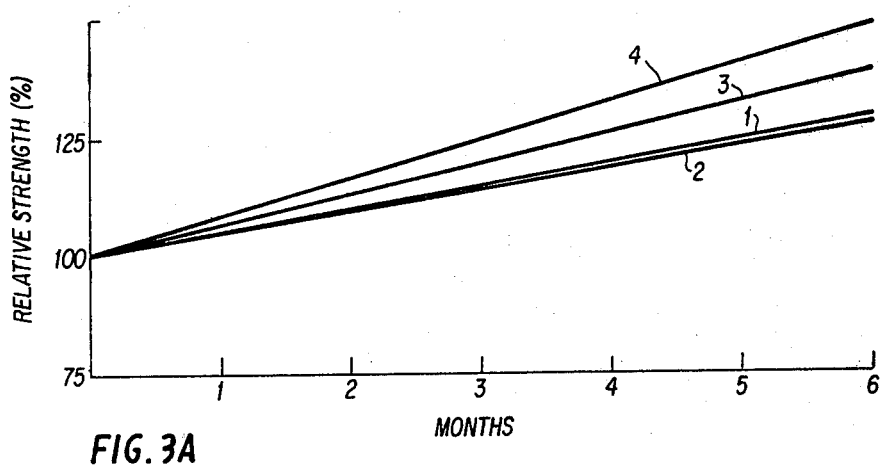
FIGS. 3A–3C are a series of graphs showing the relative strength of several cast sulfur based cement formulations which have been subjected to sulfuric acid at various strengths over a period of time.
Figure 3B:
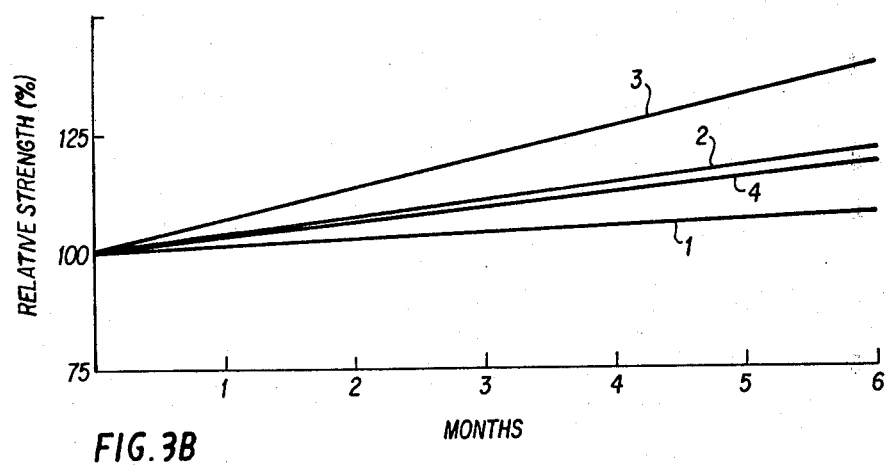
Figure 3C:
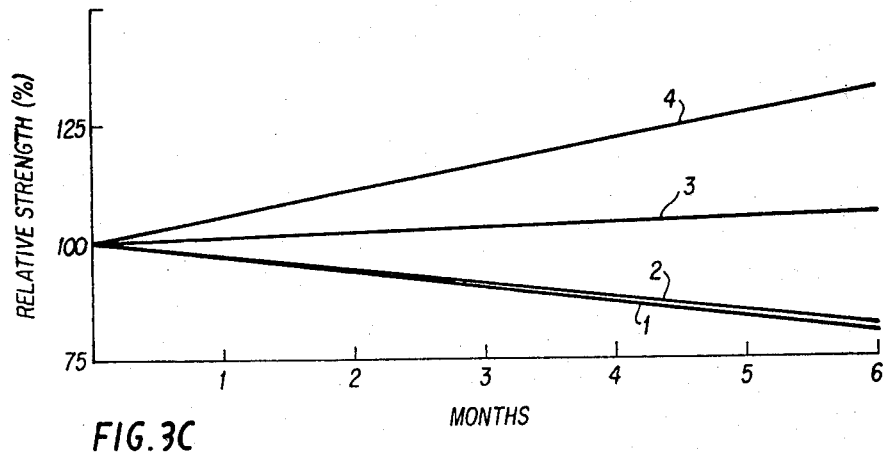
Figure 6:
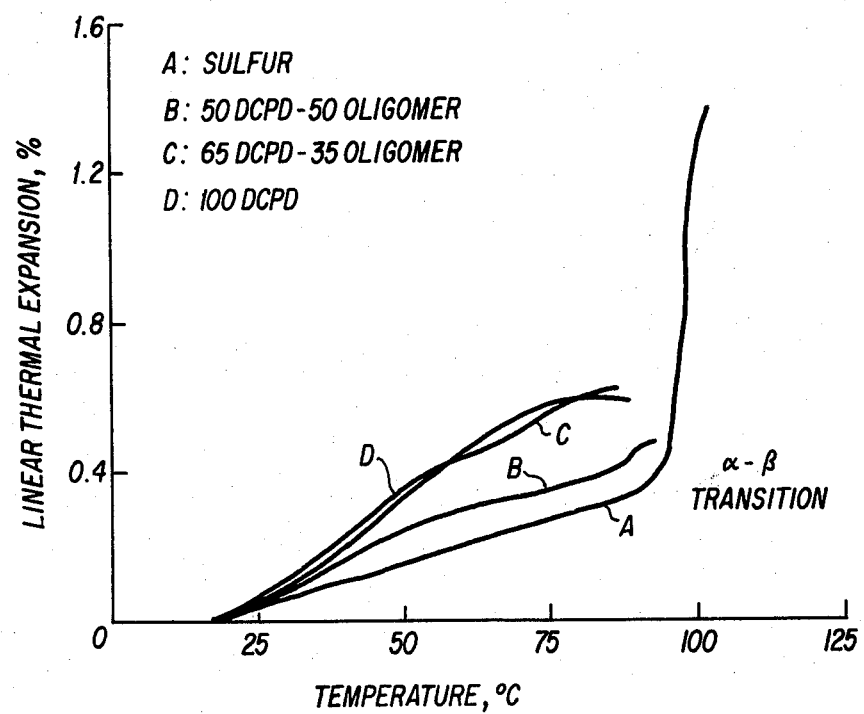
FIG. 6 is a series of graphs showing the thermal expansion properties of sulfur and several 5 wt. % modified sulfur cement samples.

Corrosion studies were conducted on two modified sulfur concrete formulations and one unmodified formulation immersed in sulfuric acid at four different strengths and a sulfur concrete prepared without a modifier. FIGS. 3A and 3B show tests on concrete samples formed by blending quartz with a modifier sulfur based on a 65-35% blend of commercial DCPD and commercial oligomer and a 50-50% blend of commercial DCPD and commercial oligomer respectively. FIG. 3C shows the results obtained for a concrete product based on an unmodified sulfur concrete. The symbols 1, 2, 3 and 4 represent sulfuric acid solutions at 10%, 20%, 60% and 93%, respectively. The initial strengths of the concrete products were 6,640 psi for the concrete of FIG. 3A, 7,600 psi for the concrete of FIG. 3B, and 6,200 psi for the concrete of FIG. 3C. The acid tests were conducted over a period of 6 months. The results show that sulfur concretes prepared with modified sulfur cements were not attached by $H_2SO_4$ solutions and in general gained in compressive strengths over the test period. Without modified sulfur, some loss of strength was noted in 10 and 20 pct $H_2SO_4$ solutions. Also, no visual attack or loss in weight was found on the sulfur concretes prepared with the modified sulfur cements. Similar results were found on immersion of sulfur concrete samples in five pct solutions of NaCl, $CaCl_2$, KCl, and $Na_2SO_4$. No loss of strength or attack on the samples was found.

A hot concentrated brine solution of $FeCl_3$, NaCl, and HCl was held in a 400 gallon tank cast of modified sulfur concrete at a temperature of 90° C. for a period of 16 months. No attack on the tank was found on circulating the brine solution in the tank over the test period.

EXAMPLE 7

Materials

Commercial-grade flake sulfur (99.9% minimum purity) from a secondary source was employed. Technical-grade dicyclopentadiene was used to modify the sulfur together with an oligomer mixture of cyclopentadiene. The oligomer mixture used in the following experiments is the oligomer product known as steam sparge oil obtained from the production of dicyclopentadiene resin. A typical oligomer starting material has the following composition: 5% cyclopentadiene, 10% each of dimer and trimer, 20% tetramer, 45% pentamer and 10% of higher polymers such as alkyl naphthalenes and vinyl dicyclopentadiene aromatic copolymer.

The data in Table 10 below show the amounts of modifier combined with sulfur and the percentages of dicyclopentadiene and oligomer in the modifier in a series of test batches. The reaction in each between sulfur and modifier was conducted at 135° C. to 140° C. In each test batch sulfur was combined with 25 lb. of sulfur cement product (present as an initiator for the reaction). Oligomer was then added to the reaction in three increments. Each addition of oligomer caused the temperature of the mixture to drop to about 125° C. so that the temperature of the mixture was allowed to increase back to 135° C. before more oligomer was added. Thereafter, the DCPD component was added to the reaction mixture in two increments the result of which was to increase the temperature of the mixture to 135° C. after each addition. After completion of the reaction, the material was drained from the reactor into storage drums.

The total time for preparing the 500 lb test batches was 30 hr. from the first addition of oligomer in order to assure a complete reaction and stability of the binder, as well as to obtain uniformity between batches for comparison purposes. The viscosity of each batch was monitored after the additions of all materials were complete, and the reaction temperatures were then held within ±5° C. until completion.

| Modifier mixture[1] /pct | | Modifier concentration | Type | |
|---|---|---|---|---|
| DCPD | Oligomer | pct | cement | Observations |
| 0 | 100 | 2-10 | Rigid | Negligible reaction, no exothermic reaction |
| 34 | 66 | 2-8 | Rigid | complete reaction, no exothermic reaction. |
| 50 | 50 | 2-8 | Rigid | Complete reaction, no exothermic reaction. |
| 50 | 50 | 10 | Rigid | Complete reaction, slight exothermic reaction. |
| 65 | 35 | 2-5 | Rigid | Complete reaction, slight exothermic reaction |
| 75 | 25 | 2-5 | Rigid | Complete reaction, significant exothermic reaction. |
| 40 | 60 | 10-20 | Flexible | Complete reaction, no exothermic reaction. |

[1]Percentages of dicyclopentadiene and oligomer expressed are of crude olefin mixtures.

From the data contained above the following conclusions can be made:

(1) Oligomer alone does not react with sulfur at temperatures up to 180° C. at concentrations below about 10%. Above 10% oligomer content, the reaction is incomplete.

(2) When the modifier is present in amounts less than 10%, at least one half of the modifier must be DCPD in order to obtain a complete reaction. Consistent with the results shown in Example 6, the modifier must contain at least 37% oligomer to control the exothermic reaction.

(3) If the modifier concentration ranges between 10% and 20%, at least 60% of the modifier must be oligomer to adequately control the reaction temperature.

The data in Table 11 below represent the results from additional tests on large scale batches of cement.

TABLE 11

Figure 4:
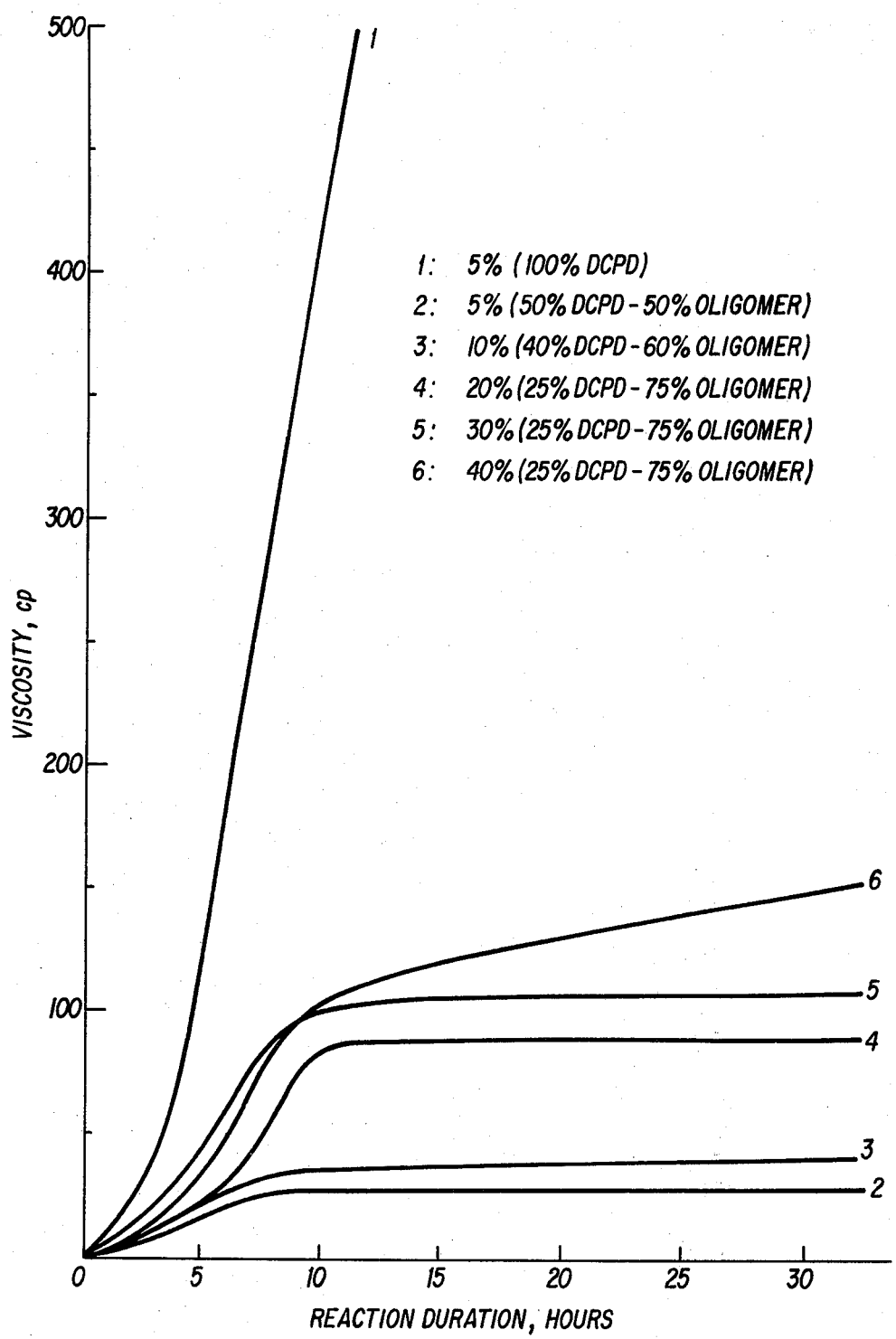
FIG. 4 is a graph showing the viscosity of sulfur cement samples at modifier concentrations of 5 wt. % to 40 wt. % versus time.

| FIG. No. Curve | Modifier mixture[1] /pct | | Modifier concentration pct | Softening point, °C. | Specific gravity | Viscosity at 135° C., cp |
|---|---|---|---|---|---|---|
| FIG. 4 | DCPD | Oligomer | | | | |
| 1 | 100 | 0 | 5 | >82 | 1.905 | >450 |
| 2 | 50 | 50 | 5 | >82 | 1.899 | 28 |
| 3 | 40 | 60 | 10 | >82 | 1.818 | 40 |
| 4 | 25 | 75 | 20 | >82 | 1.765 | 92 |
| 5 | 25 | 75 | 30 | 35 | 1.667 | 108 |
| 6 | 25 | 75 | 40 | 38 | 1.498 | 155 |

[1]Percentages of dicylopentadine and oligomer expressed areof crude olefin mixture.

The results in the table above show that for the reaction between 5% DCPD (no oligomer present) and 95% sulfur, the viscosity (at 140° C.) of the sulfur cement continue to increase almost exponentially during the reaction as shown in FIG. 4. This behavior results in a cement product which is virtually useless. FIG. 4 shows that for batch samples 2–6, stable viscosity levels were obtained (at 140° C.). Moreover, for samples 2–4 which contain from 5–20% modifier, the softening point for the rigid cement product obtained in each case is greater than 82° C.

EXAMPLE 8

Figure 5:
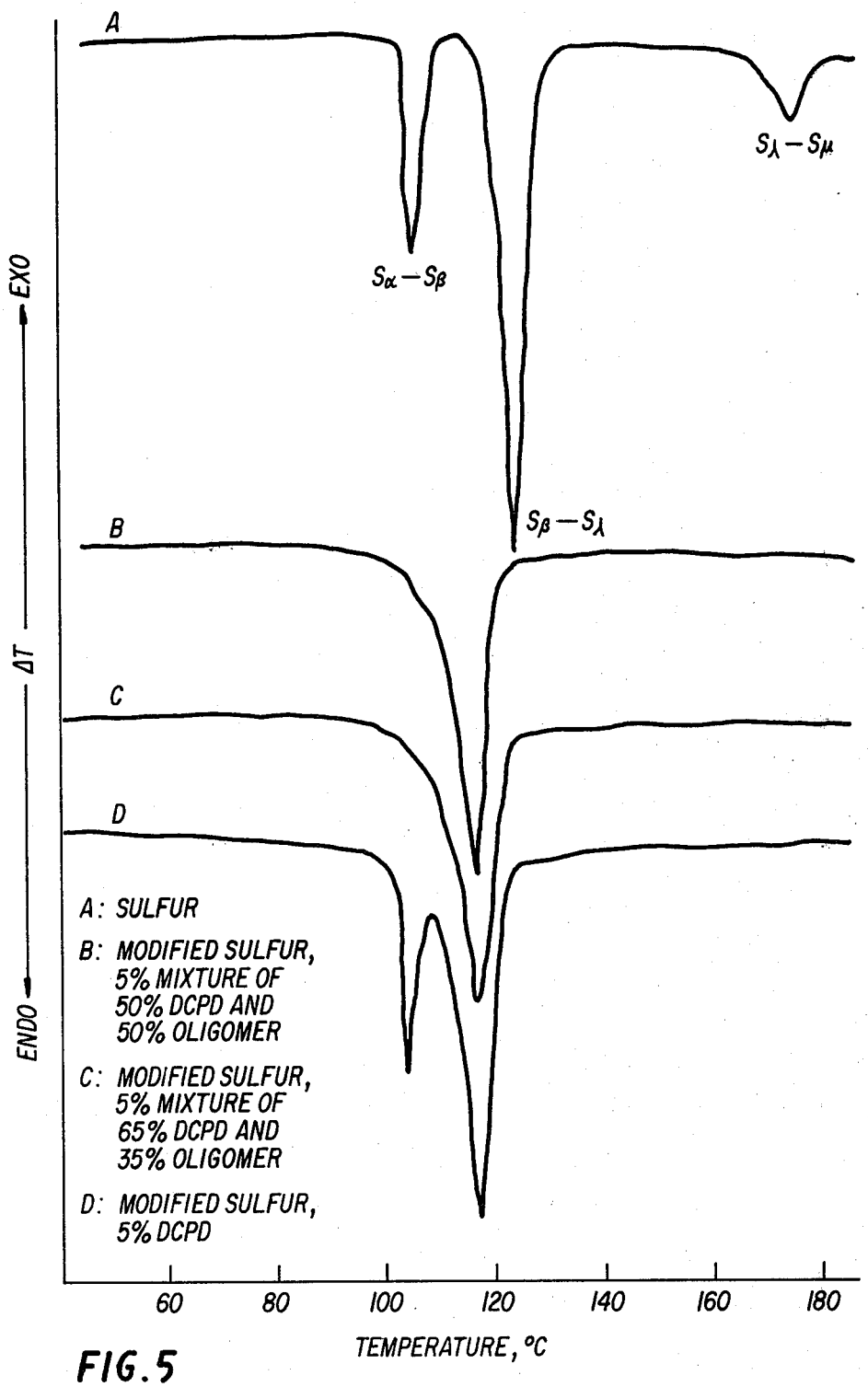
FIG. 5 is a series of DSC thermograms of sulfur and modified sulfur cements.

Differential scanning calorimetry (DSC)-thermograms for sulfur and modified-sulfur cements are shown in FIG. 5. The thermograms were made on samples having the compositions shown in the key in the FIG. 2 which had been aged for 14 months. The results indicate a transformation to orthorhombic sulfur (S$\alpha$) in DCPD-modified sulfur upon aging, while the sulfur cements based on the DCPD-oligomer modifiers remained essentially in the monoclinic form (S$\beta$). Thus, DCPD-oligomer modifiers are more effective than DCPD modifiers in retarding unreacted sulfur transformation from S$\beta$ to S$\alpha$. Durability of sulfur concretes is enhanced by eliminating internal stressing of the sulfur caused by phase transformation.

The thermal expansion properties for sulfur and the 5 pct modified sulfur cements (commercial-grade chemicals) whose composition are shown in Table 12 below, are shown in FIG. 16. Data were obtained from freshly prepared cements and indicate the extent of the $\alpha \rightarrow \beta$ transition for elemental sulfur. Transitions were not observed in the modified cements, which were heated to the softening point. The $\alpha \rightarrow \beta$ transition is one of the prime sources of failure associated with elemental sulfur concretes. Approximately 13 pct (theoretical volume) expansion is encountered through the transformation. Expansion coefficients of sulfur cements are listed in Table 12. The 50 pct oligomer cement exhibits the lowest thermal expansion coefficients of the cements tested.

TABLE 12

| Thermal expansion coefficient of sulfur cement[1] | | |
|---|---|---|
| Sulfur cement | Thermal expansion coefficient, in/in. °C. | Temperature range, °C. |
| Sulfur | 46 × 10$^{-6}$ | 25–95 |
| | 1000 × 10$^{-6}$ | 98–108 |
| 50 DCPD-50 oligomer | 59 × 10$^{-6}$ | 25–100 |
| 65 DCPD-35 oligomer | 97 × 10$^{-6}$ | 25–83 |
| 100 DCPD | 98 × 10$^{-6}$ | 25–85 |

[1]Materials formulated using 5 pct commercial grade chemicals.

EXAMPLE 9

Table 13 below provided additional data for sulfur cement samples based on modifier concentrations at 10% and above. The samples were characterized by using standard ASTM techniques developed for road-paving asphalts. These cements exhibit viscoelastic properties similar to those of asphaltic cement.

TABLE 13

| Materials | Viscosity at 135° C., cp | Sofening point °C. | Penetration, 0.01 mm | Specific gravity |
|---|---|---|---|---|
| 95 pct sulfur, 5 pct modifiers[1] | 83 | 116 | 0 | 1.905 |
| 90 pct sulfur, 10 pct modifiers[2] | 105 | 106 | 0 | 1.820 |
| 80 pct sulfur, 20 pct modifiers[2] | 149 | 105 | 5 | 1.740 |
| 70 pct sulfur, 30 pct modifiers[2] | 169 | 94 | 16 | 1.613 |
| 60 pct sulfur, 40 pct modifiers[2] | 176 | 55 | 245 | 1.485 |
| Asphalt cement (AR 4000 grade) | 252 | 49 | 41 | 1.020 |

[1]Prepared by reacting sulfur with modifiers containing 50 pct DCPD and 50 pct oligomer.
[2]Prepared by reacting sulfur with modifiers containing 25 pct DCPD and 75 pct oligomer.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A modified sulfur cement formulation, consisting essentially of:
   the polymeric reaction product of sulfur with from 2 to 20 wt. % of a cyclopentadiene oligomer mixture-dicyclopentadiene containing modifier, said cyclopentadiene oligomer mixture being free of dicyclopentadiene, wherein the cyclopentadiene oligomer mixture content of said modifier is at least 37 wt. %, said sulfur cement product having a softening point ranging up to 116° C.

2. The formulation of claim 1, wherein the content of said oligomer in said modifier ranges from 37 wt. % to 75 wt. %.

3. The formulation of claim 1, wherein from 2 to 10 wt. % modifier is combined with 98 to 90 wt. % sulfur.

4. The formulation of claim 1, wherein the sulfur-modifier mixture during the reaction leading to said cement product has a viscosity of up to about 180 cp at 135° C.

5. The formulation of claim 4, wherein said viscosity ranges from 25 to 180 cp.

6. The formulation of claim 4, wherein when said modifier ranges in concentration between 10% and 20%, at least 60 wt % of said modifier must be said oligomer component.

7. A method of preparing a hot modified sulfur cement ready for casting, comprising:

reacting sulfur with from 2 up to but not including 20 wt. % of a cyclopentadiene oligomer mixture-dicyclopentadiene containing modifier, said oligomer mixture being free of dicyclopentadiene, in which the cyclopentadiene oligomer content of said modifier is at least 37 wt. %, the mixture of sulfur and modifier during the reaction exhibiting a viscosity at 135° C. up to about 180 cp.

8. The method of claim 7, wherein said elevated temperature ranges from 115° C. to 160° C.

* * * * *